United States Patent
Gunderson

(10) Patent No.: US 8,113,548 B2
(45) Date of Patent: Feb. 14, 2012

(54) QUICK CONNECTOR FOR HIGH PRESSURE APPLICATIONS

(75) Inventor: Stephen Gunderson, Marine City, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 936 days.

(21) Appl. No.: 12/126,360

(22) Filed: May 23, 2008

(65) Prior Publication Data
US 2008/0224467 A1 Sep. 18, 2008

(51) Int. Cl.
*F16L 37/00* (2006.01)

(52) U.S. Cl. .......... 285/319; 285/305; 285/901; 138/89; 138/96 R

(58) Field of Classification Search .................. 285/319, 285/305, 901, 921; 138/89, 96 R
See application file for complete search history.

(56) References Cited

U.S. PATENT DOCUMENTS

| | | | |
|---|---|---|---|
| 5,161,832 A | 11/1992 | McNaughton et al. | |
| 5,324,082 A | 6/1994 | McNaughton et al. | |
| 5,626,371 A * | 5/1997 | Bartholomew | 285/319 |
| 5,628,531 A | 5/1997 | Rosenberg et al. | |
| 5,931,509 A * | 8/1999 | Bartholomew | 285/319 |
| 6,086,119 A * | 7/2000 | Hansel | 285/319 |
| 6,186,561 B1* | 2/2001 | Kaishio et al. | 285/319 |
| 6,250,692 B1 | 6/2001 | Ito et al. | |
| 6,536,807 B1* | 3/2003 | Raymond et al. | 285/305 |
| 6,866,304 B2 | 3/2005 | Kaminski et al. | |
| 6,883,779 B2* | 4/2005 | Borgmeier et al. | 285/319 |
| 7,029,036 B2* | 4/2006 | Andre | 285/319 |
| 7,467,813 B2* | 12/2008 | Gunderson | 285/319 |
| 7,472,931 B2* | 1/2009 | Kerin et al. | 285/319 |
| 7,488,005 B2* | 2/2009 | Gunderson | 285/319 |
| 7,614,426 B2* | 11/2009 | Kitani et al. | 138/89 |
| 7,695,022 B2* | 4/2010 | Wells | 285/901 |
| 7,891,380 B2* | 2/2011 | Gunderson | 138/96 R |
| 2005/0258646 A1 | 11/2005 | Gunderson | |
| 2006/0082149 A1 | 4/2006 | Gunderson | |

* cited by examiner

*Primary Examiner* — David E Bochna
(74) *Attorney, Agent, or Firm* — Leydig, Voit & Mayer, Ltd.

(57) ABSTRACT

A quick connector coupling to releasably connect a rigid tube into a hollow body component bore with a resilient seal member creating a fluid tight seal. A seat member retainer includes legs abutting the body component. It includes an insertion sleeve that receives the axial insertion forces to insert the seal member retainer into the bore. A protective cap is arranged to contain preassembled seal and retainer components for assembly onto the rigid tube.

19 Claims, 3 Drawing Sheets

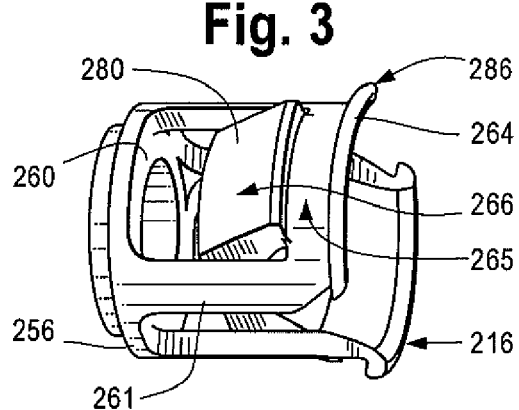
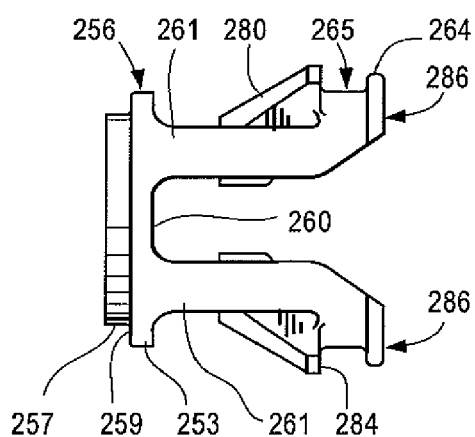
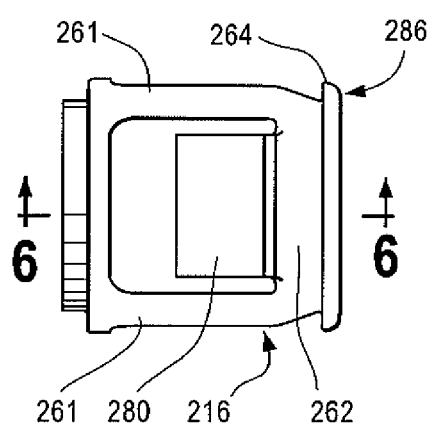
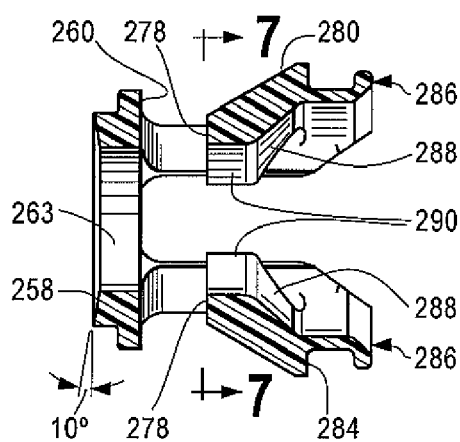
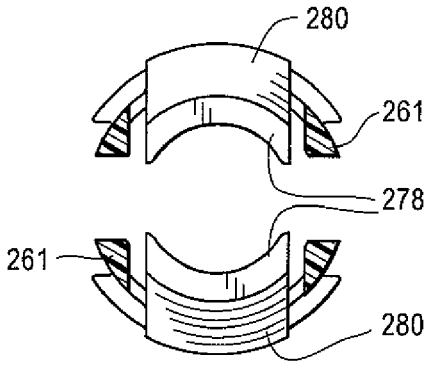

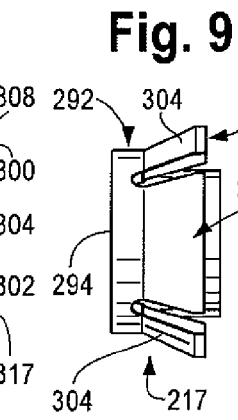
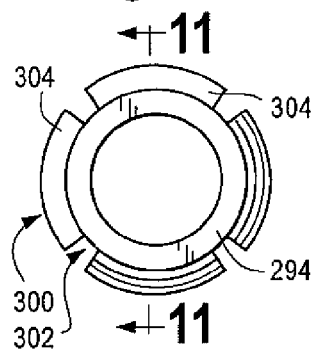
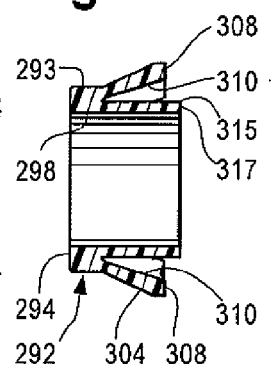
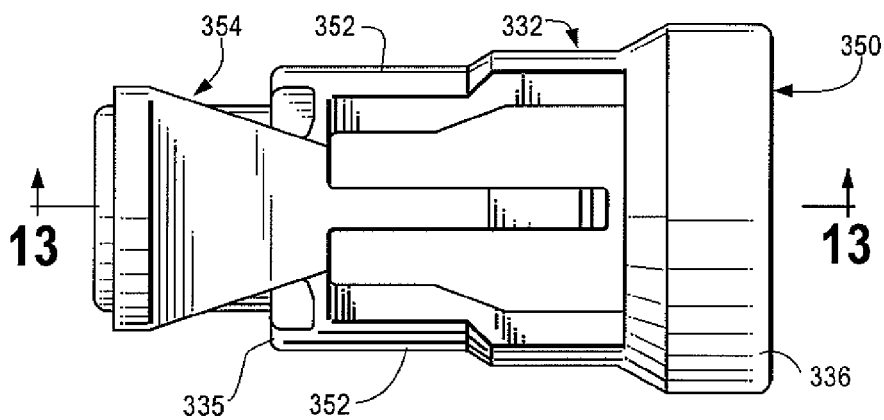
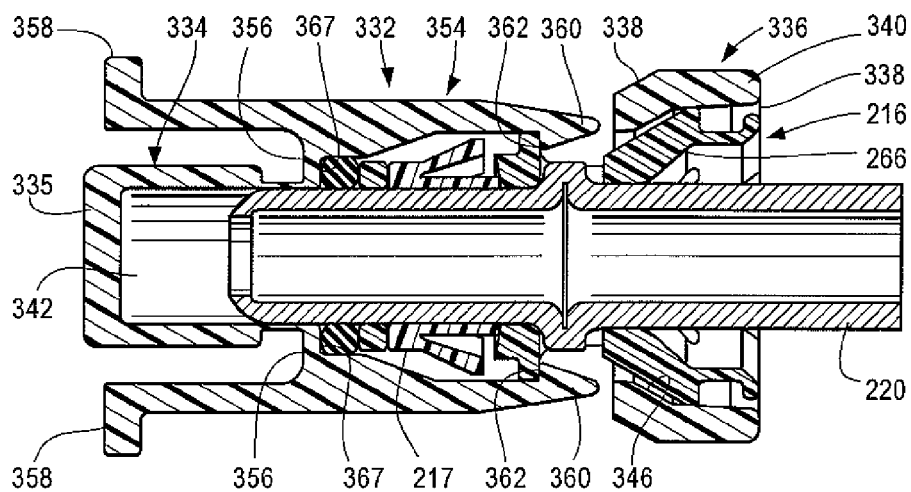

QUICK CONNECTOR FOR HIGH PRESSURE APPLICATIONS

This application claims the benefit pursuant to Title 35 U.S.C. §120 of application for U.S. patent Ser. No. 11/218, 666, filed Sep. 2, 2005, now U.S. Pat. No. 7,488,005, and application for U.S. patent Ser. No. 11/174,262 filed Jun. 30, 2005, now U.S. Pat. No. 7,467,813, the content of each of such applications are hereby incorporated by reference herein including specifications, claims and drawings.

BACKGROUND OF THE INVENTION

This disclosure relates to a quick connector couplings to releasably secure a rigid tube to a receiver body. More particularly, it relates to a quick connector coupling with a separate outer spacer to deliver axial forces on the seal member, due to fluid pressure, directly to the receiver body.

For low pressure applications, such as liquid fuel or fuel vapor, quick connectors are commonly employed. These connectors typically connect a hose to a rigid tube and have a body and internal components made of molded plastic. Such quick connectors are illustrated in U.S. Pat. Nos. 5,161,832; 5,324,082; 5,626,371; and 5,628,531.

Quick connectors employing molded components have evolved which are designed for higher pressure applications, such as power steering systems or brake systems. The quick connectors releasably secure a metal tube with an upset formed near its end to a system component made of metal. The system component includes a tube receiving port or bore shaped to coact with the connector components to releasably retain the tube in fluid tight relation to the bore in the system component. One such connector arrangement is illustrated in application for U.S. patent No. 11/218,666 filed Sep. 2, 2005, and published as No. 2006/0082149, Apr. 20, 2006, the disclosure of which, including specification, claims and drawings is incorporated herein by reference.

The connector components for high pressure applications (greater than 2,000 psi—actual system pressure) usually include a seal member in the form of an O-ring seal, a Teflon ring, an outer spacer and a retainer. The retainer includes a plurality of locking members having locking arms that releasably retain the metal tube in the bore of the system component. The quick connector retainer sustains the connection against the forces from application of fluid pressure on the end of the tube. The retainer locking members are designed with two separate pivot points to permit installation into the port of the system component, while already attached to the tube. The first pivot point, at the locking arms, allows the tube upset to pass beyond the locking arms and lock into the retainer. The second pivot point, at the column connection to the forward ring allows the retainer locking members to flex radially inward during tube assembly to the receiving bore in the system component. Two separate pivot points reduce the assembly force to acceptable levels.

The outer spacer is part of the "seal pack" which consists of a seal member such as an O-ring and one or more spacers that encompass the outside diameter of the mating tube positioned between the seal member and the outer spacer. The compression of the O-rings to the tube creates the seal while the outer spacer creates the shoulder of the gland area where the Teflon ring resides. The Teflon ring creates a compatible surface for the O-ring to abut as fluid pressure is applied. The outer spacer receives the axial load of the fluid pressure acting on the seal member.

The design requirements dictate that the quick connector outer spacer disclosed here for high pressure applications must withstand up to 5,000 pounds per square inch (psi) for power steering and brake applications. The outer spacer consists of four compressive members or legs that flex inward during assembly and snap back outward and rest within a shoulder machined into the system component body. The outer spacer sustains the assembly against axial load of fluid pressure on the O-ring. Keeping the two fluid pressure loads separate allows the quick connector to handle higher system pressures.

It has been found that installation of the preassembled tube, seal pack, outer spacer and retainer into the bore of the system component may encounter excessive axial loading. Application of an axial force is necessary to cause the compressive members of the outer spacer and the locking members of the tube retainer to pass forwardly into the receiving bore. The excess loading characteristic results from the contact of the rearward ends of the outer spacer legs with the forward face of the ring of the retainer. The present invention eliminates this relationship and provides for application of axial insertion forces independently of the outer spacer legs.

The outer spacer four compressive members or legs are symmetrical and therefore the force generated by the fluid pressure will be distributed evenly which maximizes burst performance. The arrangement of the present invention also provides for stability of the outer spacer relative to the inserted tube, even in environment of high pressure pulsation or vibration. The extended cylindrical feature of the seal member retainer contains a bore which encircles the tube and minimizes effects of vibration of tube on the seal pack. This new arrangement is designed to keep the seal pack in position even after many cycles of temperature and vibration.

BRIEF DESCRIPTION OF THE DRAWINGS

FIG. 3 is a perspective view of the tube retainer of the quick connector illustrated in FIG. 1;

FIG. 4 is a side view of the tube retainer illustrated in FIG. 3;

FIG. 5 is a top view of the tube retainer illustrated in FIG. 3;

FIG. 6 is a sectional view of the tube retainer of FIG. 3 taken along line 6-6 in FIG. 5;

FIG. 7 is a sectional view of the tube retainer of FIG. 3 taken along the line 7-7 of FIG. 6;

FIG. 8 is a side view of the outer spacer or seal member retainer of the embodiment of the quick connector illustrated in FIG. 1;

FIG. 9 is a side view of the seal member retainer illustrated in FIG. 8 rotated forty-five degrees (45°) about its longitudinal axis;

FIG. 10 is a front view of the seal member retainer illustrated in FIG. 8;

FIG. 11 is a cross-sectional side view of the seal member retainer of FIG. 8 taken along line 11-11 of FIG. 10.

FIG. 12 is a side view of a protective cap to surround the retainer, seal member retainer, seal member assembly and male member of the quick connector coupling assembly of FIG. 1 prior to installation into a system component.

FIG. 13 is a sectional view of the protective cap of FIG. 12 taken along the line 13-13 of FIG. 12.

DETAILED DESCRIPTION OF ILLUSTRATED EMBODIMENTS

Figure 1:
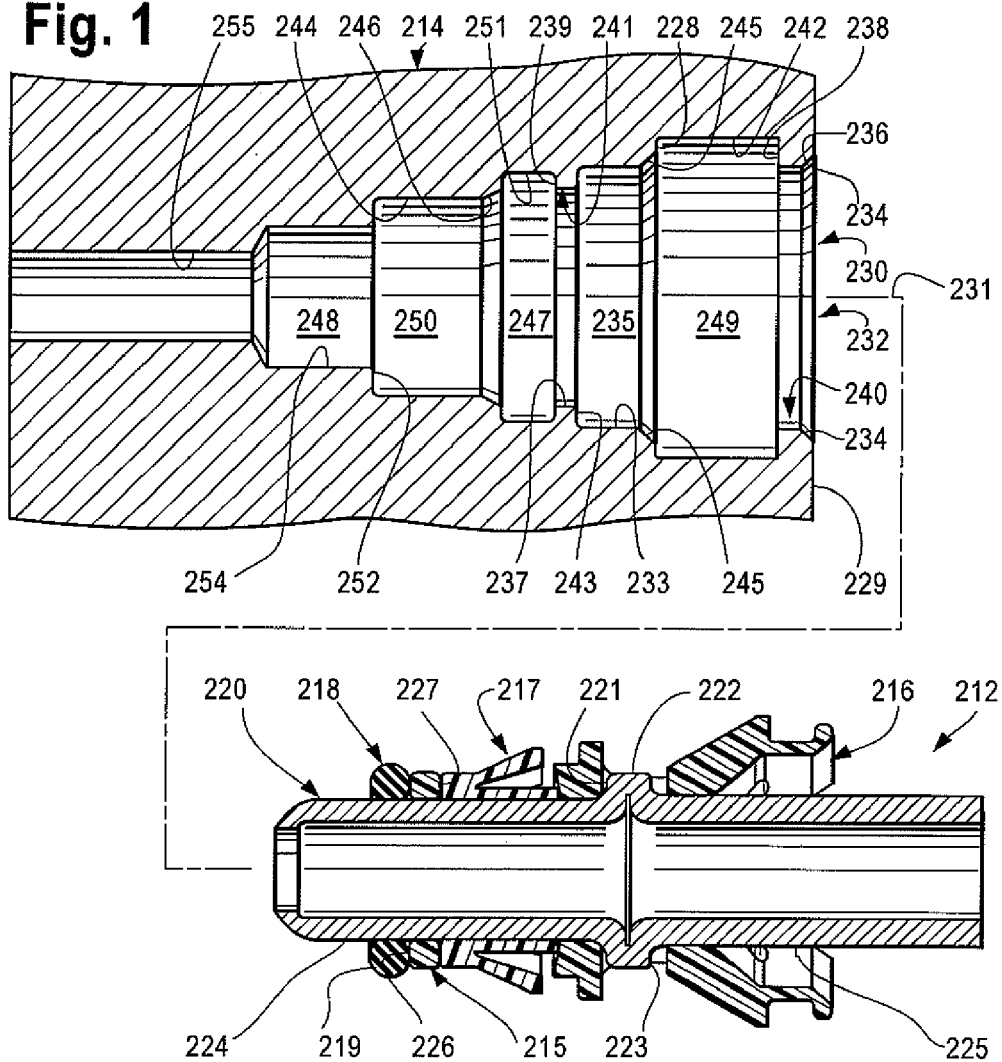
FIG. 1 is a sectional view of a fuel system component and tube with connector elements prior to insertion into the component bore.

An embodiment of a fluid coupling assembly in accordance with the present invention is illustrated in FIGS. 1-11. The quick connector fluid coupling assembly 210 comprises a male member 212, a hollow female connector body 214, a tube retainer 216 for securing the male member 212 within the connector body 214, seal member assembly or seal pack 218, and an outer spacer or seal member retainer 217.

The male member 212 is formed by the end of a hollow rigid tube 220. The tube 220 may connect to a component in a fluid line system, or may itself be a portion of a component in a fluid line system. The male member 212 includes a radially enlarged annular upset 222 spaced from the free end of the tube. It has a forward facing generally radial annular surface 221 and rearward facing generally radial annular surface 223. The male member 212 has an outer cylindrical sealing surface 224 between the upset 222 and the free end of the tube. A cylindrical portion 225 of the tube extends rearward beyond upset 222 and may include an end configured to be connected to a flexible hose. Such configuration would be typical of automotive air conditioning system applications.

Figure 2:
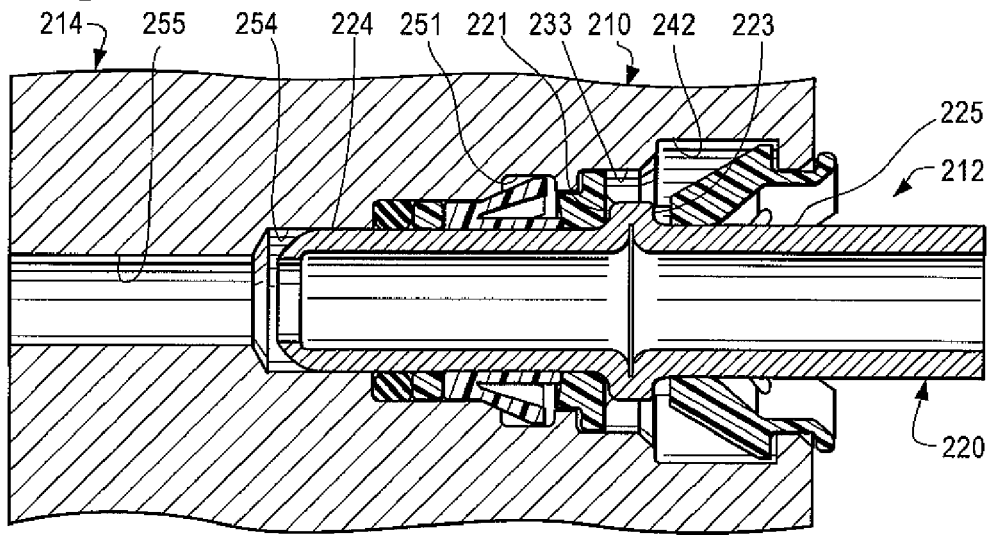
FIG. 2 is a sectional side view of the fuel system component with the tube and connector assembled into the component bore.

The system component or connector body 214 is illustrated in cross section in FIGS. 1 and 2. The connector body 214 is a component of a high pressure fluid system such as a vehicular air conditioning system. The component may be a compressor, condenser, evaporator or other system component. It could, of course, be any body that is configured with a cavity to receive the coupling assembly components and male member. It could also be a body configured with threads to attach to another system component or could be a body with a stem end adapted to connect to a flexible hose.

As illustrated in FIGS. 1 and 2, the connector body 214 is hollow and defines an axial tube, seal pack and retainer receiving bore 230 extending axially forward from an entrance opening 232 formed in planar wall 229 of body 212. The bore 230 is symmetrical about a central axis 231. The bore 230 is divided into several portions: a tube retainer locking member receiving portion 249, a retainer ring and upset receiving portion 235, a seal member retainer receiving portion 247, a seal member receiving portion 250, a tube end receiving portion 248, and a reduced diameter fluid passage 255 in communication with the interior of body 214.

With regard to connector body 214 the term forward means toward passage 255 from entrance opening 232 and the term rearward means toward entrance opening 232 from passage 255. The term inner or inward means radially toward the axis 231 and outer or outward means radially away from axis 231.

Entrance opening 232 is defined by an axially extending cylindrical surface 236 through which the male member 212 with sealing and retainer components attached passes to be placed within bore 230. Chamfer 234 intersects planar wall 229 of body 214 and axially extending cylindrical surface 236. It facilitates insertion of the tube retainer 216 into the connector body 214.

Forward of axially extending cylindrical surface 236 is a radial annular abutment or locking surface 238 within retainer receiving portion 249 of bore 230. The surface 238 serves as an abutment or locking surface to retain the tube retainer 216 within the bore 230 which, in turn, releasably retains the male member 212 in fluid tight relation with body 214.

Planar wall 229, chamfer 234, axially extending cylindrical surface 236 and radial annular locking or abutment surface 238 define a rim 240 at entrance opening 232 of bore 230. Axially extending cylindrical surface 236 defines the radial inner surface of rim 240.

Axially forward of the locking surface 238 is an enlarged diameter cylindrical surface 242 followed by a radial annular surface 228. The radial annular locking surface 238, forward radial annular surface 228 and enlarged diameter cylindrical surface 242 define the tube retainer locking member receiving portion 249 of bore 230.

Forward of the radial annular surface 243 is an intermediate axially extending cylindrical surface 233. It is sized to receive the forward ring of the tube retainer 216. It also surrounds the upset 222 of the tube when it is fully inserted into the body component 214. Intermediate axially extending cylindrical surface 233 terminates at radial annular surface 243 followed by axially extending cylindrical surface 237. Radial annular surface 243 and axially extending cylindrical surface 237 are intersected by chamfer 245. The chamfer aids in insertion of seal member and seal member retaining component into bore 230 during assembly.

Forward of axially extending cylindrical surface 237 is a radial annular seal member retainer locking surface 239 which serves as an abutment surface to retain the outer spacer or seal member retainer 217 against axial rearward movement.

Radial annular surface 243, chamfer 245, axially extending cylindrical surface 237, and radially extending annular seal member retention surface 239 define rib 241 the radially inner cylindrical surface of which is cylindrical surface 237.

Forward of radial annular seal member retainer locking surface 239 is cylindrical relief 251 followed by conical surface 246 that converges forward and merges with an axially extending cylindrical sealing surface 244. The radial annular seal member retention surface 239, cylindrical relief 251 and conical surface 246 define the seal member retainer receiving portion 247 of bore 230.

Cylindrical sealing surface 244 has a diameter slightly smaller than the outer diameter of seal member 219 and extends from its merger with conical surface 246 forward to forwardmost radial annular surface 252. The seal receiving portion 250 of bore 230 is defined by axially extending cylindrical sealing surface 244 and forwardmost radial annular surface 252.

Axially forward from forwardmost radial annular surface 252 is cylindrical tube receiving surface 254 which defines the tube receiving portion 248 of axial bore 232. It is sized to closely overlie the outer cylindrical sealing surface 224 of the male member 212 to coaxially pilot the male member 212 within bore 230. The passage defined by cylindrical surface 254 communicates fluid within the system to the interior of the body component 214 through cylindrical passage 255. Forward radial annular surface 252 connects between cylindrical sealing surface 244 and passage 255. It also defines a forward radial abutment for seal member assembly 218.

Referring to FIG. 3, seal member assembly 218 provides a fluid tight seal between cylindrical surface 244 of the bore 230 of connector body 214 and the outer cylindrical sealing surface 224 of male member 212. It resides forward of outer spacer or seal member retainer 217 within seal receiving portion 250 of bore 230 defined by cylindrical surface 244.

Seal member assembly 218 includes a seal member, here an annular, elastomeric O-ring 219 that surrounds outer cylindrical sealing surface 224 of tube 220 between its free end and upset 222 and provides fluid tight joint between the cylindrical sealing surface 244 of body 214 and the cylindrical portion 224 of male member 212. The outer diameter of the O-ring 219 is slightly larger than the diameter of the cylindrical sealing surface 244. The inner diameter of O-ring 218 is slightly smaller than the diameter of cylindrical portion 224 of male member 212. When the fluid system is under pressure, the O-ring creates a fluid tight seal against these surfaces.

The seal pack 218 further includes an annular spacer 215. Having a forward radial annular face 226 and an rearward radial annular face 227. The annular spacer 215 is a ring of generally rectangular cross section. It is made of polytetraflourethelene (PFTE) or Teflon (Teflon is a registered trademark of DuPont). It may also be filled with about thirteen percent graphite.

Forward radial surface 252 within bore 230 of body component 214 defines a radial seat surface for seal member assembly 218. When the fluid system is pressurized, O-ring seal member 219 of the seal member assembly 218 is urged rearward toward entrance opening 232 along outer cylindrical sealing surface 224 of tube 220 and cylindrical sealing surface 244. It abuts forward radial annular surface 226 of spacer 215. Spacer 215 is urged rearward and rearward radial annular face 227 abuts forward abutment surface 294 of ring 293 of seal member retainer 217. The axial load imparted to seal member retainer 217 is transferred from rear abutment surfaces 308 on legs 300 to radial annular seal member retainer locking surface 239 of rib 241 in bore 230 of connector body 214.

The tube retainer 216 is illustrated in FIGS. 3-7. It is disposed in the tube retainer locking member receiving portion 249 and retainer ring and upset receiving portion 235 of bore 230 of the connector body 214. It is releasably connected to rim 240 at the entrance opening 232, to secure the male member 212 within the connector body 214. The retainer 216 is preferably made of plastic, such as nylon 6-12.

Tube retainer 216 includes cylindrical ring 256. It is slidably mounted on the cylindrical sealing surface 224 of the tube 220 of male member 212. The ring 256 defines an inner cylindrical surface 263 with a diameter slightly greater than the outer diameter of male member cylindrical surface 224, but less than the diameter of upset 222 of male member 212.

Ring 256 includes a forward facing generally radial annular surface 258. This surface, best seen in FIG. 6, is angled somewhat from a plane perpendicular to the longitudinal axis of retainer 216. It forms a conical shape diverging forwardly and outwardly from inner cylindrical surface 263 at an angle of about ten degrees (10°). The ring 256 also includes rearward facing radial annular surface 260.

Ring 256 includes an axially extending outer cylindrical portion 253, a forward, reduced diameter cylindrical portion 257, and a forward radial annular wall 259. Outer cylindrical portion 253 is sized to be received in intermediate axially extending cylindrical surface 233 with radial annular wall 259 in abutting relation to radial annular surface 243 of annular rib 241 to restrict axially forward movement of tube retainer 216. Reduced diameter cylindrical portion 257 is sized to be received in axially extending cylindrical surface 237 at rib 241.

The retainer 216 includes two locking members 286 extending axially rearward from ring 256. Locking members 286 are integrally joined to and extend axially rearward from the rearward facing radial annular surface 260 of ring 256. Each locking member 286 includes two parallel support legs 261 extending from surface 260 of ring 256. Legs 261 are joined at their distal ends by a cross beam 262. The cross beam 262 includes a finger release tab 264 and a groove 265 to receive the entrance rim 240 of the connector body 214. The internal radial spacing between the two cross beams 262 is greater than the outer diameter of the upset 222. Hence, the upset 222 of male member 212, can pass between the cross beams 262 without resistance. This spacing also permits the locking members 286 to flex radially inward toward the rear outer cylindrical surface 225 of tube 220 on insertion of the tube with retainer attached through axially extending cylindrical surface 236 at rim 240.

A locking arm 266 is centrally mounted on each cross beam 262 between the support beams 261 of the locking member. Each locking arm 266 extends forwardly from the cross beam 262 at a radially inward angle, such that the arms converge forwardly terminating in an upset, or forward radial abutment surface 278. The abutment surfaces 278 are adapted to be placed in an abutting relationship with the rearward radial annular surface 223 of male member upset 222.

Each locking arm 266 includes a rear abutment surface 284 adapted to reside in an abutting relationship with the radial annular locking surface 238 of rim 240 of connector body 214.

Each locking arm 266 has a top ramped surface 280 between radial abutment surface 278 and rear abutment surface 284. Each arm 266 has a forwardly angled interior surface 288 that terminates at cylindrical surface 290. The forwardly angled interior surface 288 is engaged by the upset 222 rigid tube 212 on installation of the retainer 216 onto the tube. This contact spreads the locking arms to permit passage of upset 222 to the space between the rear surface 260 of ring 256 and the forward or front abutment surfaces 278 of locking arms 266.

The axial spacing between the radial abutment surfaces 278 and the rearward facing radial annular surface 260 of ring 256 is slightly greater than the axial length of upset 222. That is, when the connector is assembled, the upset 222 resides in the space between rearward facing radially annular surface 260 and radial front abutment surfaces 278 of locking arms 266.

The outer spacer or seal member retainer 217 is illustrated in FIG. 8-11. The seal member retainer 217 includes an annular ring 292 at a forward axial end. The ring 292 has an outer cylindrical surface 293 sized to slidably fit into the axially extending cylindrical surface 244 of seal member receiving portion 250 of bore 230 in a piloting relation. Interior cylindrical bore surface 298 is sized to slidably fit in piloting relation onto outer cylindrical sealing surface 224 of tube 220. Ring 292 has a forward facing annular abutment surface 294.

Four legs 300 extend axially rearward and radially outward from the rear of the ring 292. Each leg 300 has a ramped top surface 304, a rear abutment surface 308, and a conical bottom surface 310. Four axially extending elongated slots 302 are defined between each of the adjacent legs 300 and extend to the ring 292. The slots 302 allow the legs 300 to flex radially inward relative to the ring 292.

An axially extending annular insertion cylinder 315 extends rearwardly from annular ring 292 radially inward of legs 300. It includes an inner cylindrical surface that is an extension of inner cylindrical bore surface 298. Cylinder 315 also includes a rearward radial annular insertion surface 317.

The overall length of outer spacer 217, between forward facing abutment surface 294 and rearward radial insertion surface 317 is longer than the axial spacing between forward facing abutment surface 294 and rear abutment surfaces 308 of legs 300. This overall length is such that with the ramped top surfaces 304 of legs 300 in contact with conical surface 246 of seal member receiving portion 250 of bore 230 the rearward radial insertion surface 317 contacts forward facing radial surface 258 of ring 256 of tube retainer 216. By virtue of this relationship, insertion of the seal member retainer 212 forward of radial seal member retention surface 239 can be accomplished by axial forces imparted to it through tube retainer 216. Moreover, this relationship avoids imparting any such axial forces onto the radially outwardly directed legs 300, minimizing the forces required to deflect the legs radially inward toward tube 220 on insertion forward of seal member retention surface 239.

Notably, the piloting relation of the outer cylindrical surface 293 with cylindrical sealing surface 244 and the inner cylindrical surface 298 with the outer cylindrical sealing surface 224 of tube 220 of male member 212 and the axial extent of the inner cylindrical bore 298 from forward facing abutment surface 294 to rearward radial annular insertion surface 317 stabilizes the tube 220 within the bore 230 of connector body 214.

Prior to completion of a fluid coupling, the sealing and retainer components reside on the male member 212, as illustrated in FIG. 1. To complete the coupling, the tube 220, with retainer 216, seal member retainer 217, and seal member assembly 218 in place, is axially inserted into the bore 230 of a system component 214.

Axial forward movement of male member 212 is effective to impart the necessary axial forces to the associated components. To complete the assembly, the legs 300 of seal member retainer 217 must deflect radially inwardly to pass through axially extending cylindrical surface 237 to enter cylindrical relief 251 to place rear abutment surfaces 308 in abutting relation with radial seal member retainer locking surface 239.

Similarly, the locking arms 266 of tube retainer 216 must deflect radially inward toward cylindrical surface 225 of tube 220 to pass through axially extending cylindrical surface 236 at rim 240 to place rear abutment surfaces 284 of locking arms 266 in abutting relation with radial annular abutment or locking surface 238 of rim 240.

The upset 222 resides between rearward facing radial annular surface 260 of ring 256 of tube retainer 216 and forward radial abutment surfaces 278. Forward facing angled annular surface 258 of ring 256 is in contact with radial annular insertion surface 317 of insertion cylinder 315 of outer spacer 217. Axial forces imparted to tube 220 are delivered to seal member retainer 217 through this abutting relationship. Notably, the diverging conical surface 258 concentrates the axial forces passed to insertion surface 317 of insertion cylinder 315 such that the components remain coaxial with surface 224 of tube 220. Moreover, since the tube retainer 216 does not contact the legs 300 of seal member retainer 217, forces that could resist or hinder radial inward deflection of the legs 300 as they surpass rib 241 are avoided.

The male member 212 is urged axially into bore 230 of body component 214. The free end of tube 220 enters cylindrical tube receiving surface 254. Seal member assembly 218 with O-ring 219 and spacer 215 enter seal receiving portion 250 with the O-ring in sealing contact with the cylindrical sealing surface 244 of bore 230 and outer cylindrical sealing surface 224 of tube 220. Outer cylindrical surface 293 of outer spacer or seal member retainer 217 also enter cylindrical sealing surface 244 of bore 230. It is fully inserted when ramped top surfaces 304 of legs 300 contact conical surface 246. When so positioned, O-ring seal 219 is adjacent forwardmost radial annular surface 252 in bore 230 and rear abutment surfaces 308 are in abutting relation to radial annular seal member retainer locking surface 239. Also, the locking arms 266 of the tube retainer 216 clear rim 240 and spread radially outwardly within retainer member receiving portion 249 of bore 230. Rear abutment surfaces 284 of locking arms 266 move into abutting relation to locking surface 238 to secure the fluid coupling.

The present invention contemplates pre-assembly of the retaining and seal assembly components onto the male member 212 for later insertion into a system component 214 to complete a fluid path. For this purpose, a protective cap 300 is provided.

FIGS. 12 and 13 illustrate a connector cap generally designated 332 which releasably holds the components for pre-assembly onto the end of tube 220. It is molded from a polymeric material such as nylon, high density polyethylene, or other suitable material. Protective cap 332 is generally annular and includes a hollow sleeve 334 having a closed forward end 335. Cap 332 includes an annular ring 336 spaced rearward of sleeve 334 with a forward conical portion 338 and a rearward cylindrical portion 340. Two columns 352, located diametrically opposite each other connect annular rearward end 335 of sleeve 334 to the conical portion 338 of ring 336.

The sleeve 334 and annular ring 336 are coaxial about an axial centerline. Hollow sleeve 334 defines internal bore 342 having a diameter slightly larger than the diameter of cylindrical portion 224 of tube 220 of male member 212. It is sized to receive tube end and a portion of cylindrical portion 224 of tube 220 when the sub-assembly is attached to a male member 212.

The rearward cylindrical portion 340 of ring 336 of protective cap 332 defines a bore extending from an entrance opening 350. When the retainer 216 and seal member assembly 218 are disposed within protective cap 332 the ring 336 generally overlies the locking arms 266 of retainer 216. Inner cylindrical bore of the portion 340 of ring 336 generally overlies the cross beams 262 of locking member 286 of tube retainer 216. The inner conical surface of forward conical portion 338 is sized to closely overlie the top ramped surfaces 280 of the locking arms 266. The conical portion 338 is arranged to axially urge retainer 216 onto tube 220. It imparts axial force to the top ramped surfaces 280 near their radially outer ends. The retainer flexibility allows the locking arms 266 to flex radially outward to pass the upset 222 into position between forward abutment surfaces 278 and rearward facing radial annular surface 260.

Extending radially outward from the axially rearward end of the sleeve 334 are two securement clips 354 located diametrically opposite each other between the columns 352. Each securement clip 352 includes an actuator 358 connected to rearward end of sleeve 334 by a radial narrowed neck portion 356 that allows the securement clip 354 to flex relative to the remainder of the protective cap 332. The clips define rearward facing radial surfaces 367.

A radially inward facing hook 360 extends axially rearward from the neck portion 356 of each actuator 358. The hooks 360 releasably connect the protective cap 332 to the ring 256 of tube retainer 216 The hooks 360 include radial edges 362 that grasp rearward radial annular surface 260 of ring 256 of tube retainer 216.

The hooks define a space that extends from edges 362 to rearward facing radial surfaces 367 of neck portions 356. The space is sized to contain, in axial array, the seal member assembly 218 including O-ring 219 and spacer 215, along with outer spacer or seal member retainer 217 between rearward radial surfaces 367 and the forward facing, radial surface 258 of ring 256 of retainer 216. Radial surface 258 of ring 256 is in abutting relation with insertion surface 317 of seal member retainer 217. O-ring seal member 219 is compressed axially to urge neck portions 356 axially forward. This relationship places an axial biasing force on the cap 332 sufficient to cause the edges 362 of hooks 360 to remain engaged with surface 260 on the tube retainer 216.

After installation of the seal member assembly 218, outer spacer 217, and retainer 216 onto tube 220, the cap may be released from the assemblage by radial inward deflection of the actuators 358 toward sleeve 334. Such action disengages the edges 362 of hooks 360 from ring 256 of tube retainer 216. The cap is then removable from male member 212 leaving the sub-assembly of tube, sealing and retaining elements as illustrated in FIG. 1, ready for insertion into bore 230 of body component 214.

With the seal member assembly 218, seal retainer 217 and the retainer 216 inserted onto the male member 212, this sub-assembly may be inserted into the bore 230 of the component body 214 to create a fluid tight connection. The tube 220 is urged axially forward into bore 230. The seal member assembly or seal pack 218 enters the cylindrical sealing surface 244 of body component 214 and the ring 256 of tube retainer 216 passes through entrance opening 232 into retainer member receiving portion 249.

Axial forward impetus is delivered to ring 256 by upset 222. In turn, forward facing radial surface 258 is in contact with rearward radial annular insertion surface 317 of axially extending insertion cylinder 315 of seal member retainer or outer spacer 217. All axial forward insertion forces are delivered through insertion cylinder 315 to ring 292 without involving locking legs 300. The legs 300 are unimpaired from radial inward deflection to pass through axially extending cylindrical surface 237 at rib 241. As a result, the forces necessary to position legs 300 with rear abutment surface 308 in abutting relation with radial annular seal member locking surface 239 is minimized and overall insertion forces maintained below established limits.

The seal member assembly 218 with O-ring seal 219, is disposed within cylindrical sealing surface 244 adjacent forwardmost radial annular surface 246. Annular spacer 215 is disposed rearward of O-ring 219. As the seal member retainer 217 is urged axially forward into the connector body 214, the ramped top surface 304 of each leg 300 contacts chamfer 245 and intermediate axially extending cylindrical surface 237 at rib 241. The legs 300 flex radially inward relative to the annular ring 292. After the legs 300 have surpassed intermediate cylindrical surface 237 the legs 300 spring radially outward within the seal member retainer receiving portion 247 to a position with the rear abutment surfaces 308 of legs 300 in abutting facing relation with the radial annular seal member retaining locking surface 239. The legs are disposed in the cylindrical relief 251 with a portion of the ramped top surfaces 304 of legs 300 located in closely spaced facing relation to the conical surface 243 of the connector body 214.

The ring 292 of seal member retainer 217 is disposed in the seal receiving portion 250 of the connector body 214. In this position, the seal member retainer 217 is constrained radially and axially within the seal member retainer receiving portion 247 and seal member receiving portion 250 of the connector body 214. The ring 292 of retainer 217 is disposed within cylindrical sealing surface 244 in closely spaced piloting relation. The forward portions of ramped top surfaces 304 of legs 300 abut the conical surface 246 to hold the spacer 217 against axially forward movement. The rear abutment surfaces 308 of the legs 300 abut the radial annular seal member retaining surface 239 and hold the seal retainer 217 from moving axially rearward.

The O-ring 219 is constrained within the seal receiving portion of the connector body 214. The outer diameter surface of the O-ring 219 contacts the cylindrical sealing surface 244 of the connector body 214 and is slightly compressed against cylindrical sealing surface 244 of the connector body 214. The O-ring 219 is disposed adjacent forwardmost radial annular surface 252, and is in abutting facing relation to the forward facing surface 226 of spacer 215. Rearward radial annular face 227 of spacer 215 is in abutting relation to forward facing abutment surface 294 to constrain the seal pack 218 from moving axially rearward.

With the seal retainer so positioned, axial load imparted to seal member assembly 218 by fluid pressure is transferred to seal member retainer 217. The rearward axial forces on O-ring 219 are directed to forward facing surface 294 of seal member retainer 217. Such axial forces cause the radial rear abutment surfaces 308 of legs 300 to abut radial annular seal member retaining surface 239.

Continued axial insertion of the male member 212 with preassembled components urges free ends of locking arms 266 through entrance opening 232. As the arms 266 of retainer 216 are inserted into the entrance opening 232 of connector body 214, the top ramped surface 280 of each arm 266 contacts chamfer 234 and cylindrical surface 236 of rim 240. Insertion of the retainer 216 axially inward causes the arms 266 to flex radially inward toward tube surface 225. After the arms 266 of retainer 216 have been inserted into the retainer receiving portion 249 of the connector body 214, the arms 266 spring radially outward and the retainer 216 is releasably secured to connector body 214.

In its properly inserted position, the retainer 216 is constrained on the rim 240 of connector body 214. The cylindrical surface 236 and chamfer 242 of rim 240 reside in channel 265 of the retainer 216. The ring 256 is positioned with reduced diameter cylindrical portion 257 in axially extending cylindrical surface 237 of rib 241 with forward facing annular surface 259 of the ring 256 disposed in facing relation to the radial annular surface 243 of the body 214 to limit the retainer 216 from further axial forward movement. The locking arms 266 are disposed within retainer receiving portion 249 of bore 230 with rear abutment surfaces 284 of the locking arms 266 abutting the radial annular abutment or locking surface 238 within retainer receiving portion 249 to prevent the retainer 216 from moving axially rearward. The retainer 216 thus releasably attached to body 214 at rim 240.

When so assembled a complete fluid coupling is achieved between tube 220 and component body 216. It is suitable for high pressure applications and can maintain a fluid seal even with high fluid pressure in the system such as an automotive brake system and even against frequent pressure pulsation within the system.

As is well known, disconnection of the tube 220 can be accomplished using a suitable release tool inserted along cylindrical surface 225 of tube 220. Such a tool has an annular shape with an outer surface having a diameter about the same as the diameter of upset 222 of tube 220. Insertion of the annular member into retainer 216 along tube surface 225 causes locking arms 266 to deform outwardly within retainer receiving portion 249 of bore 230. When arms 266 are sufficiently deformed radially outward, tube 220 may be withdrawn and upset 222 is free to pass rearward out of its connection with the retainer 216.

To reassemble the quick connect coupling, the male member 212 is inserted axially inward through entrance opening 232. The free end of male member 212 passes into bore 263 in ring 256 of retainer 216 and the inner bore 298 of the seal member retainer 217, and into annular seal member assembly 218. These components surround cylindrical surface 224 of tube 220. The upset 222 of the male member 212 contacts the forwardly angled interior surfaces 288 of the arms 266. Since the diameter of the upset 222 is greater than the diameter of portions of the surfaces 288, axially forward insertion of the male member 212 causes the arms 266 to spread radially outward. Once male member 212 has been sufficiently inserted axially inward for the upset 222 to surpass the arms 266, the arms 266 spring radially inward. The free end of the tube 220 is at this time positioned within, and piloted within surface 254 of tube receiving portion 248 of body 214.

It is preferable that the tube retainer 216 and seal member retainer 217 be molded of a polymeric material of sufficient strength, for example polyetheretherketone, also known as PEEK. A suitable PEEK for forming the retainer and/or seal member retainer of the present invention is available under the trademark Victrex PEEK™ 450G.

Various features of the present invention have been described with reference to the above illustrative embodiments. It should be understood that modifications may be made without departing from the spirit and scope of the invention as represented by the following claims.

The invention claimed is:

1. A fluid coupling assembly comprising: a connector body defining a bore extending axially from an entrance opening defined by a radially inward extending rim, said connector body further including a radially inward extending annular rib within said bore axially forward of said rim, said body defining a retainer receiving portion between said rim and said rib, and a seal member receiving portion having a cylindrical sealing surface forward of said rib; a tube retainer releasably secured to said connector body, said retainer including a ring having a forward facing generally radial annular surface, a plurality of arms extending axially and rearwardly from said ring, each said arm including a rear abutment surface in abutting relation with said rim; a seal member disposed in said bore in sealing relation with said cylindrical sealing surface in said seal member assembly portion bore of said connector body, and, a separate seal member retainer disposed within said bore between said seal member and said rib, said seal member retainer releasably retaining said seal member in said seal member receiving portion, said seal member retainer including an annular ring and an insertion sleeve, including a rearward radial annular insertion surface in abutting relation with said forward facing generally radial annular surface on said ring of said tube retainer, wherein said rib includes a radial annular seal member retainer locking surface, said seal member retainer includes a plurality of legs extending rearward and radially outwardly from said ring, each said leg including a rear abutment surface in abutting relation with said seal member locking surface of said rib.

2. A fluid coupling assembly as claimed in claim 1 wherein said body includes a cylindrical relief forward of radial annular seal member retainer locking surface followed by a conical surface that converges forward and merges with said axially extending cylindrical sealing surface, and said rear abutment surfaces of said legs of said seal member retainer are disposed in said cylindrical relief and portions of said legs thereof are surrounded by said conical surface.

3. A fluid coupling assembly as claimed in claim 1 wherein said ring of said seal member retainer includes a forward facing annular abutment surface and the length of said seal member retainer from said forward facing annular abutment surface to said rearward radial annular insertion surface is longer than the axial spacing between said forward facing annular abutment surface and said rear abutment surfaces of said legs.

4. A fluid coupling as claimed in claim 3 wherein said forward facing generally radial annular surface of said ring of said tube retainer forms a conical shape diverging forwardly and radially outwardly.

5. A fluid coupling as claimed in claim 3 wherein said coupling includes a rigid tube, said tube having an outer cylindrical sealing surface, said ring and said insertion sleeve of said seal member retainer defining an inner cylindrical bore extending between said forward facing abutment surface of said ring and said rearward radial insertion surface, said seal member retainer disposed with said inner cylindrical bore in closely spaced piloting relation to said cylindrical sealing surface of said tube.

6. A fluid coupling as claimed in claim 5 wherein said tube includes a radial annular upset, spaced from an end thereof, said arms of said tube retainer each include a forward radial abutment surface, said forward radial abutment surfaces in abutting relation to said upset.

7. A fluid coupling as claimed in claim 6 wherein said assembly includes a seal member assembly including an annular spacer disposed in abutting relation to said forward facing annular abutment surface of said ring of said seal member retainer.

8. A fluid coupling as claimed in claim 7 wherein said seal member assembly includes an O-ring in sealing relation to said cylindrical sealing surface of said bore of said body and said cylindrical sealing surface of said tube, and said annular spacer is disposed between said O-ring and said forward facing annular abutment surface of said ring of said seal member retainer.

9. A fluid coupling assembly as claimed in claim 8 wherein said annular spacer includes a forward radial annular face in abutting relation to said O-ring and a rearward radial annular face in abutting relation to said forward facing annular abutment surface of said ring of said seal member retainer.

10. A fluid coupling as claimed in claim 5 wherein ring of said seal member retainer includes an outer cylindrical surface disposed in closely spaced piloting relation to said cylindrical sealing surface in said bore of said body.

11. A fluid coupling assembly as claimed in claim 10 wherein said rib of said body includes an axially extending cylindrical surface, and said ring of said tube retainer includes a reduced diameter cylindrical portion disposed in said axially extending cylindrical surface of said rib.

12. A fluid coupling assembly as claimed in claim 11 wherein said rib includes a rearward radial annular surface and said ring of said tube retainer includes a forward radial annular wall, said forward radial annular wall in abutting relation with said rearward radial annular surface of said rib.

13. A fluid coupling as claimed in claim 5 wherein said forward facing generally radial annular surface of said ring of said tube retainer forms a conical shape diverging forwardly and radially outwardly.

14. A cap for protecting components of a fluid coupling including a generally hollow sleeve, an annular ring spaced from said sleeve, at least one column connecting said sleeve and said ring, spaced securement clips, each secured to said sleeve by narrowed neck portion, each said clip including an actuator overlying said sleeve and a radially inward directed hook extending from said neck portion toward said ring.

15. A protective cap as claimed in claim 14 wherein said neck portions define rearward facing radial surfaces and said hooks include radial edges.

16. A preassembled sub-assembly for a quick connector fluid coupling including: a tube retainer including a ring having a forward facing generally radial annular surface and a rearward facing annular surface; a seal member assembly; a separate seal member retainer including an annular ring and an insertion sleeve, including a rearward radial annular insertion surface; a cap for protecting components of a fluid coupling including a generally hollow sleeve, an annular ring spaced from said sleeve, at least one column connecting said sleeve and said ring, spaced securement clips, each secured to said sleeve by a narrowed neck portion, each said clip including an actuator overlying said sleeve and a radially inward directed hook extending from said neck portion toward said ring wherein said neck portions define rearward facing radial surfaces and said hooks include radial edges defining a space extending to said rearward facing radial surfaces, said seal member assembly, said annular ring and insertion sleeve of said seal member retainer, and said ring of said tube retainer disposed in said space with said rearward radial annular insertion surface of said sleeve of said seal member retainer in abutting relation to said forward facing generally radial annular surface of said ring of said tube retainer.

17. A preassembled sub-assembly as claimed in claim 16 wherein said ring of said seal member retainer includes a forward facing annular abutment surface in abutting relation to said seal member assembly and said radial edges of said hooks are in abutting relation to said rearward facing annular surface of said ring of said tube retainer.

18. A preassembled sub-assembly as claimed in claim 17 wherein said seal member retainer includes a plurality of legs extending rearwardly from said ring, each said leg including a rear abutment surface disposed intermediate said forward facing annular abutment surface and said rearward radial annular insertion surface.

19. A preassembled sub-assembly as claimed in claim 18 wherein said tube retainer includes a plurality of arms extending axially and rearwardly from said ring of said tube retainer and said annular ring of said cap is in overlying relation to said arms of said tube retainer.

\* \* \* \* \*

UNITED STATES PATENT AND TRADEMARK OFFICE
CERTIFICATE OF CORRECTION

| | |
|---|---|
| PATENT NO. | : 8,113,548 B2 |
| APPLICATION NO. | : 12/126360 |
| DATED | : February 14, 2012 |
| INVENTOR(S) | : Stephen Gunderson |

Page 1 of 1

It is certified that error appears in the above-identified patent and that said Letters Patent is hereby corrected as shown below:

On the title page, please add the following information:

Related U.S. Application Data

(63) Continuation-in-part of application No. 11/218,666, filed Sept. 2, 2005, now U.S. Pat. No. 7,488,005, which is a continuation-in-part of application No. 11/174,262, filed on Jun. 30, 2005, now U.S. Pat. No. 7,467,813.

Signed and Sealed this
Twenty-fourth Day of April, 2012

David J. Kappos
*Director of the United States Patent and Trademark Office*